US008875019B2

(12) United States Patent
Tan et al.

(10) Patent No.: US 8,875,019 B2
(45) Date of Patent: Oct. 28, 2014

(54) VIRTUAL CULTURAL ATTACHE

(75) Inventors: Martin Tan, Melbourne (AU); Melanie June Youngson, Ballarat (AU)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 12/724,544

(22) Filed: Mar. 16, 2010

(65) Prior Publication Data
US 2011/0231792 A1 Sep. 22, 2011

(51) Int. Cl.
G06F 3/00 (2006.01)
G06Q 10/10 (2012.01)
G06F 17/30 (2006.01)

(52) U.S. Cl.
CPC ........ G06F 17/30654 (2013.01); G06Q 10/107 (2013.01)
USPC ........... 715/703; 715/708; 715/751; 715/753; 715/810; 715/264; 715/265; 704/2; 704/4

(58) Field of Classification Search
CPC ....... G06F 3/048; G06F 9/4448; G06F 17/28; H04N 7/15
USPC .......................... 715/810, 703, 708, 751, 753
See application file for complete search history.

(56) References Cited

U.S. PATENT DOCUMENTS

| | | | | |
|---|---|---|---|---|
| 5,535,120 A | * | 7/1996 | Chong et al. | 704/3 |
| 5,734,923 A | * | 3/1998 | Sagawa et al. | 715/204 |
| 6,047,299 A | * | 4/2000 | Kaijima | 715/236 |
| 6,622,123 B1 | * | 9/2003 | Chanod et al. | 704/277 |
| 6,996,520 B2 | * | 2/2006 | Levin | 704/10 |
| 7,369,998 B2 | * | 5/2008 | Sarich et al. | 704/277 |
| 7,409,333 B2 | | 8/2008 | Wilkinson et al. | |
| 7,451,188 B2 | * | 11/2008 | Cheung et al. | 709/206 |
| 7,689,407 B2 | * | 3/2010 | Yang et al. | 704/3 |
| 7,849,144 B2 | * | 12/2010 | Prajapat et al. | 709/206 |
| 7,873,508 B2 | * | 1/2011 | Chino et al. | 704/2 |

(Continued)

FOREIGN PATENT DOCUMENTS

| | | |
|---|---|---|
| WO | WO 96/25713 | 8/1996 |
| WO | WO 2004/049110 | 6/2004 |
| WO | WO 2008/025645 | 3/2008 |
| WO | WO 2009/036114 | 3/2009 |

OTHER PUBLICATIONS

Richardson et al.; Using Bilingual ETD Collections to Mine Phrase Translations; JCDL'07, Jun. 18-23, 2007, Vancouver, British Columbia, Canada, copyright 2007 ACM 978-1-59593-644-9/07/0006; pp. 352-353.

(Continued)

*Primary Examiner* — Dino Kujundzic
(74) *Attorney, Agent, or Firm* — Schmeiser, Olsen & Watts; John Pivnichny

(57) ABSTRACT

A method and system for presenting choices of different translations of a message and corresponding interpretations of the different translations. The message that is input by a sender to be sent to an intended recipient is received. Choices of the different translations of the message and different corresponding interpretations of the different translations are retrieved and presented. The different translations are in a language understood by the recipient. The different interpretations are specific to a culture of the recipient. A selection of a translation of the different translations is received. The selection of the translation is based on a review of the different interpretations by the sender. The selected translation is presented to the recipient.

20 Claims, 8 Drawing Sheets

(56) References Cited

U.S. PATENT DOCUMENTS

| | | | |
|---|---|---|---|
| 8,032,355 B2* | 10/2011 | Narayanan et al. | 704/2 |
| 2005/0010421 A1* | 1/2005 | Watanabe et al. | 704/277 |
| 2006/0184355 A1* | 8/2006 | Ballin et al. | 704/8 |
| 2007/0067436 A1* | 3/2007 | Vaughn | 709/224 |
| 2007/0206017 A1* | 9/2007 | Johnson et al. | 345/473 |
| 2007/0219775 A1 | 9/2007 | Smith | |
| 2007/0294078 A1 | 12/2007 | Kim et al. | |
| 2010/0121630 A1* | 5/2010 | Mende et al. | 704/7 |
| 2010/0179991 A1* | 7/2010 | Lorch et al. | 715/810 |
| 2010/0198579 A1* | 8/2010 | Cunnington et al. | 704/3 |
| 2010/0257462 A1* | 10/2010 | Barrett et al. | 715/756 |

OTHER PUBLICATIONS

Watters et al.; Semantic processing performance of Internet machine translation systems; Internet Research Electronic Networking Applications and Policy; vol. 9—No. 2—1999—pp. 153-160, copyright MCB University Press—ISSn 1066-2243; pp. 153-160.

* cited by examiner

VIRTUAL CULTURAL ATTACHE

FIELD OF THE INVENTION

The present invention relates to a method and system for providing translations of text or speech messages, and more particularly to a real-time messaging system that provides translations enhanced by culturally-specific interpretations.

BACKGROUND OF THE INVENTION

Phrases and descriptions of feelings, emotions, ideas, states, levels of respect are difficult to translate to another culture. Even degrees of magnitude, gestures, metaphors and analogies may have different meanings across cultural boundaries. Known translation applications rely on the sender of a translated message to determine and make allowances for different cultural interpretations of the message; however, for many senders, their knowledge of different cultural interpretations is deficient. Using a skilled human interpreter to determine the cultural nuances associated with a translated message to be sent is slow, expensive, and not always accessible. Thus, there exists a need to overcome at least one of the preceding deficiencies and limitations of the related art.

SUMMARY OF THE INVENTION

The present invention provides a computer-implemented method of presenting choices of different translations of a message and corresponding interpretations of the different translations. The method comprises:

a computer system receiving the message input by a first user (sender) to be sent to a second user (recipient);

a processor of the computer system retrieving and presenting choices of the different translations of the message and different corresponding interpretations of the different translations, wherein the different translations are in a language understood by the recipient, and wherein the different interpretations are specific to a culture of the recipient;

the computer system receiving a selection of a translation of the different translations, wherein the selection of the translation is based on a review of the different interpretations by the sender; and the computer system presenting the selected translation to the recipient.

A system, program product and processes for supporting computing infrastructure corresponding to the above-summarized method are also described and claimed herein.

Embodiments of the present invention provide a technique for presenting cultural nuances that provide context to translations of a message and that are specific to the culture of an intended recipient of the message. Based on a review of the cultural nuances by a sender of the message, the sender selects an appropriate translation and increases knowledge about the culture of the intended recipient. Communicating with the present invention may promote an interest in other cultures and languages.

DETAILED DESCRIPTION OF THE INVENTION

Overview

Embodiments of the present invention provide a messaging system that presents choices of translations of a message along with culturally-specific interpretations of each choice. In one embodiment, the messaging system retrieves the translation choices and the corresponding culturally-specific interpretations from a translation database. The interpretations presented are specific to the culture of the user who is designated to receive the translated message (i.e., the intended recipient). A user (i.e., the sender), who is going to send the message to the recipient via a computer network, reviews the culturally-specific interpretations of each choice and based on the interpretations, selects one of the choices. The messaging system sends the selected translated message to the recipient.

In one embodiment, the messaging system provides multiple collaborators with an interface via the computer network to allow the collaborators to store contributions of additional interpretations of messages in a translation database, thereby extending the translation database. Each additional interpretation is specific to the culture of the collaborator who contributes the interpretation (or to a culture about which the collaborator is knowledgeable).

In one embodiment, because the sender reviews the translated choices and the associated culturally-specific interpretations, the messaging system may educate the sender about the culture of the intended recipient and/or promote the sender's interest in another culture and/or another language, in addition to providing the translated message that is selected by the sender and sent to the recipient.

In one embodiment, the messaging system is an object-oriented, real-time messaging system. In one embodiment, the messaging system employs assistance "clouds" that present the culturally-specific interpretations of the translations.

Virtual Cultural Attache System

Figure 1:
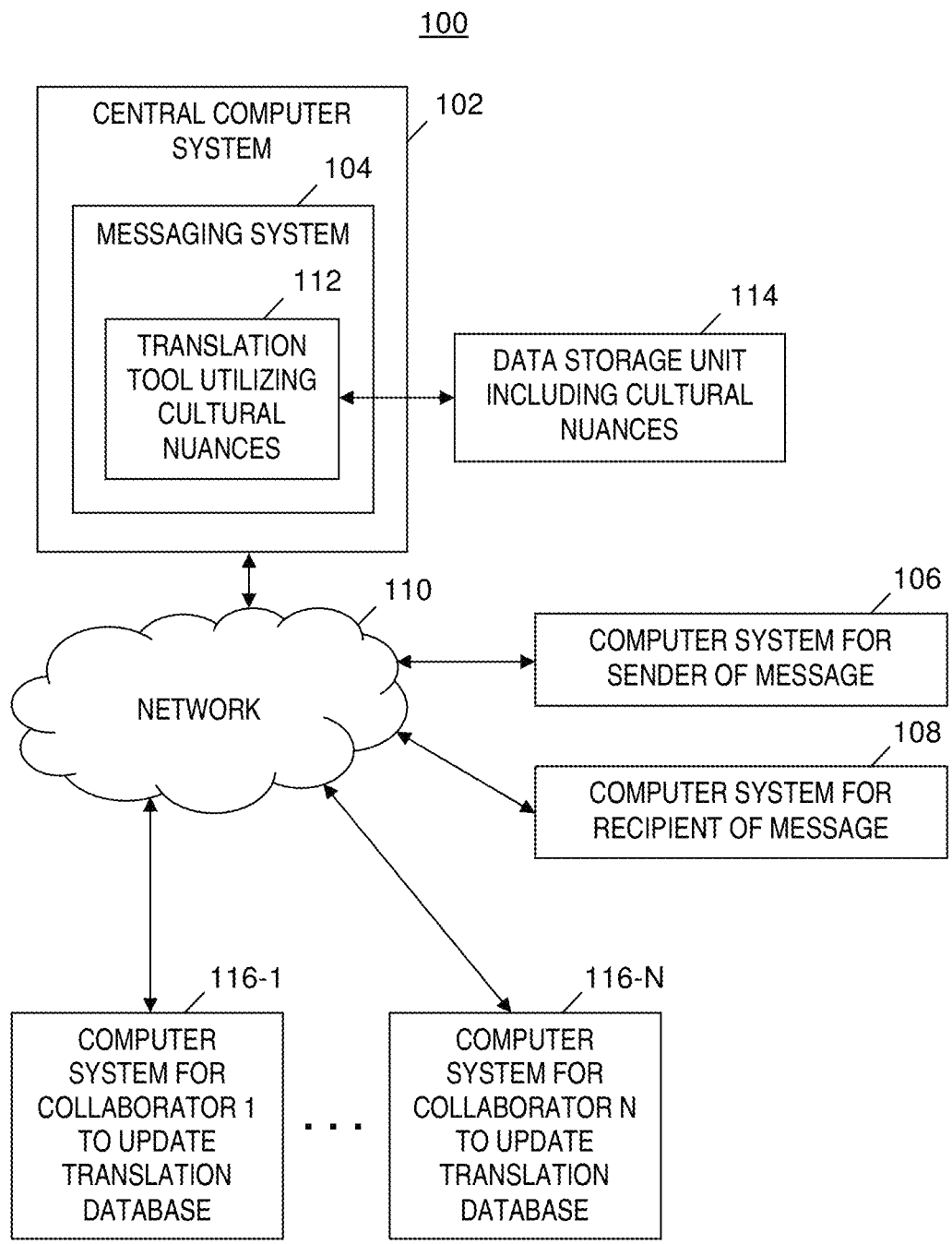
FIG. 1 is a block diagram of a system for presenting translation choices and corresponding cultural nuances, in accordance with embodiments of the present invention.

FIG. 1 is a block diagram of a system for presenting translation choices and corresponding cultural nuances, in accordance with embodiments of the present invention. System 100 includes a central computer system 102 that runs a software-based messaging system 104 (e.g., an instant messaging system). System 100 also includes a computer system 106 utilized by a sender to send a translated message to a computer system 108 utilized by a recipient of the message. Computer system 106 sends the message to computer system 108 via a computer network 110. A software-based translation tool 112 translates the message to provide one or more translation choices. The translation tool 112 retrieves cultural nuances corresponding to all or part of each of the translation choices. Further, the translation tool 112 presents a communication instance that includes the translation choices and the corresponding cultural nuances. The translation tool 112 functions as a virtual cultural attaché that assists the sender of the message in selecting an appropriate translation based on requirements of the culture of the recipient, even though the sender may have little or no knowledge of the culture of the recipient.

Translation tool 112 retrieves the corresponding cultural nuances from a computer data storage unit 114. In one embodiment, data storage unit 114 includes a translation database (not shown) (or another type of collection of data) that associates words, phrases and/or sentences of a sentences of a translated message with a culture of a recipient of the message and with corresponding cultural nuances that are specific to the culture of the recipient.

System 100 optionally includes a plurality of computer systems 116-1, . . . , 116-N utilized by a plurality of contributors (i.e., collaborators) who may create and update the cultural nuances included in data storage unit 114. For example, translation tool 112 includes collaborative software such as wiki software that provides an interface via which the plurality of contributors may collaboratively create and edit data structures that include cultural nuances included in storage unit 114. In one embodiment, each contributor contributes or edits cultural nuances based on the contributor's bi-cultural knowledge.

In one embodiment, computer system 106 is included in the plurality of computer systems 116-1, . . . , 116-N. In another embodiment, computer system 106 is not included in the plurality of computer systems 116-1, . . . , 116-N.

In one embodiment, computer system 108 is included in the plurality of computer systems 116-1, . . . , 116-N. In another embodiment, computer system 108 is not included in the plurality of computer systems 116-1, . . . , 116-N.

As used herein, a computer system may include, but is not limited to, a server computer, a personal computer, or a smartphone or other mobile computing device.

Presenting Translations with the Virtual Cultural Attache

Figure 2A:
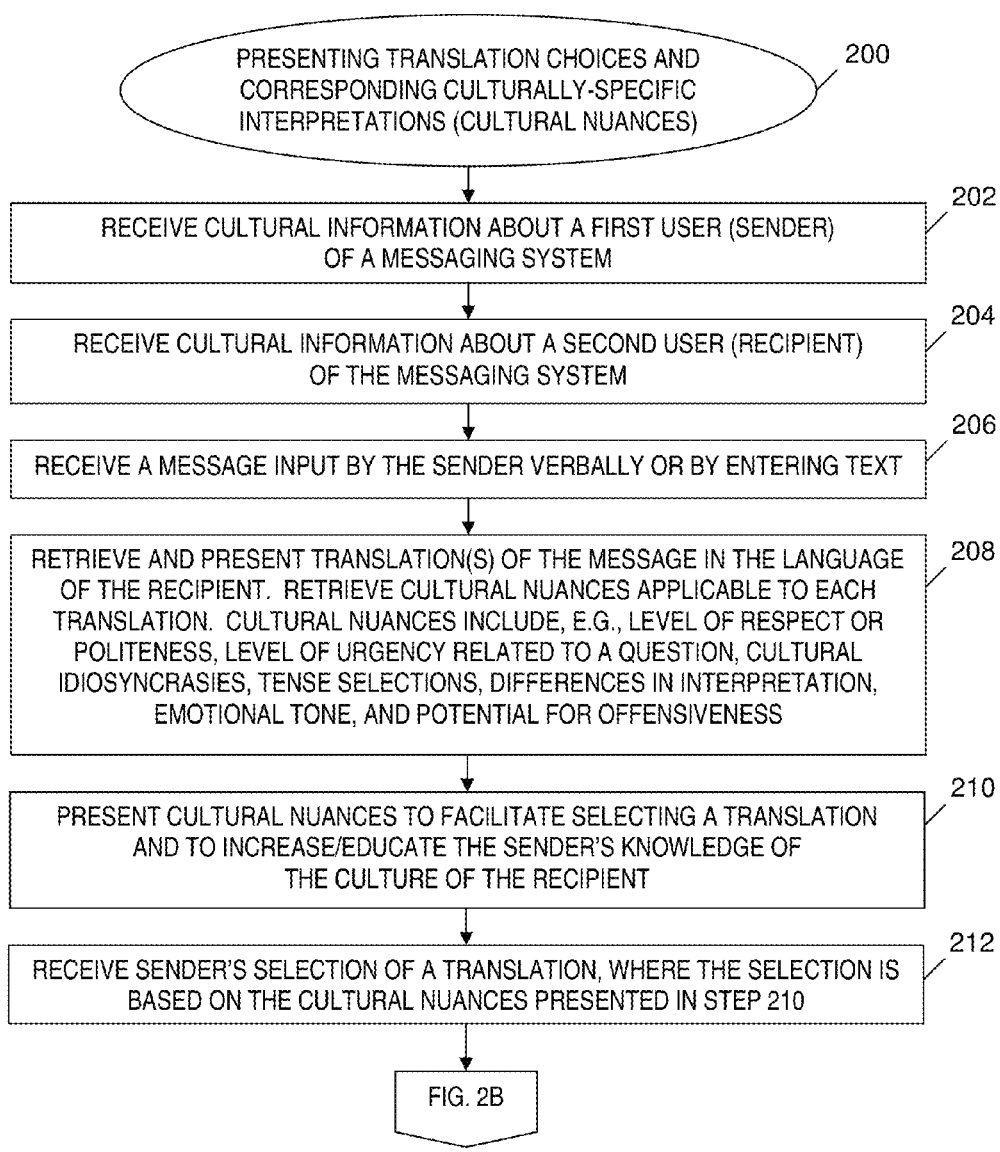
FIGS. 2A-2C depict a flowchart of a process for presenting translation choices and corresponding cultural nuances, where the process is implemented by the system of FIG. 1, in accordance with embodiments of the present invention.
Figure 2B:
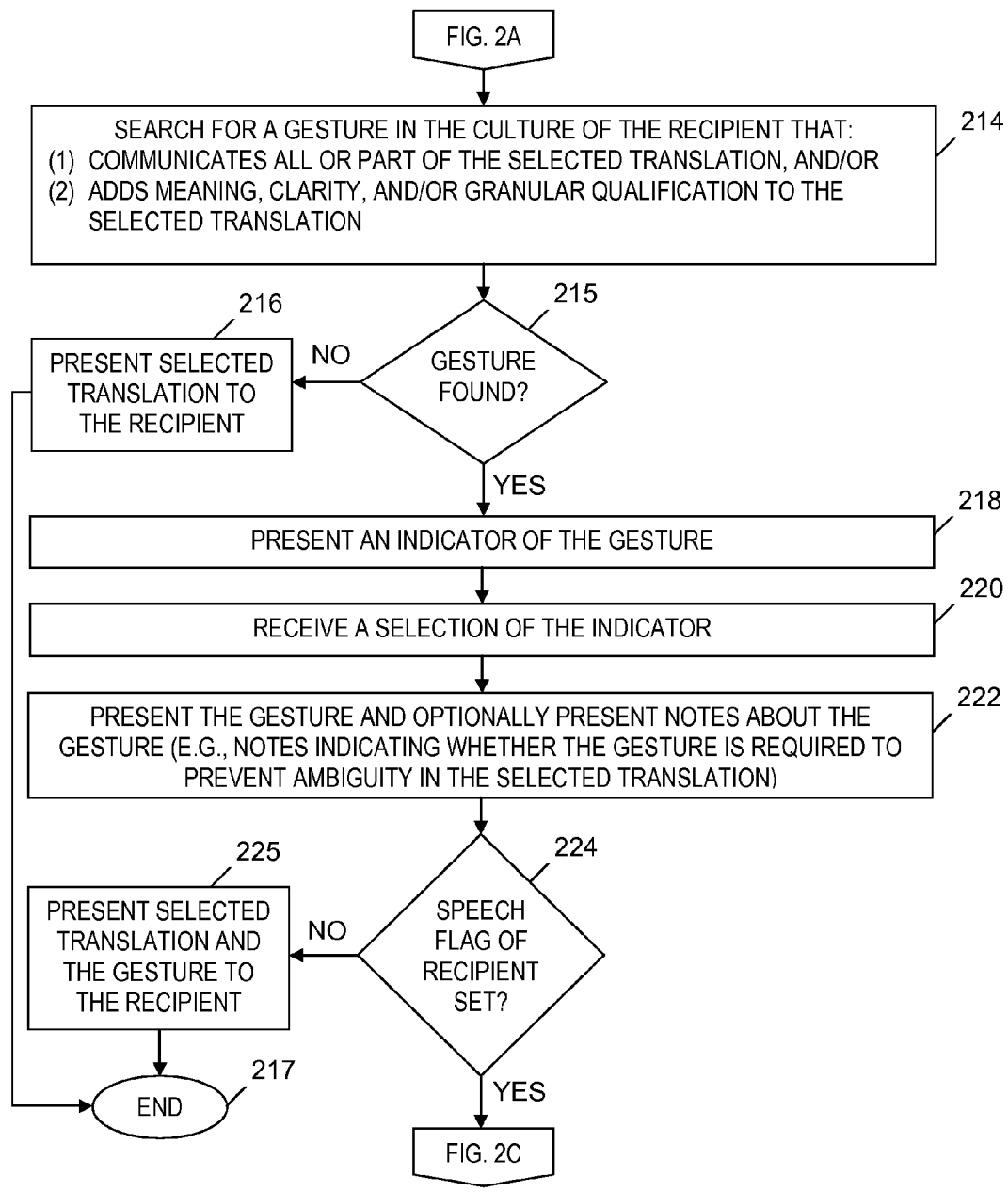
Figure 2C:
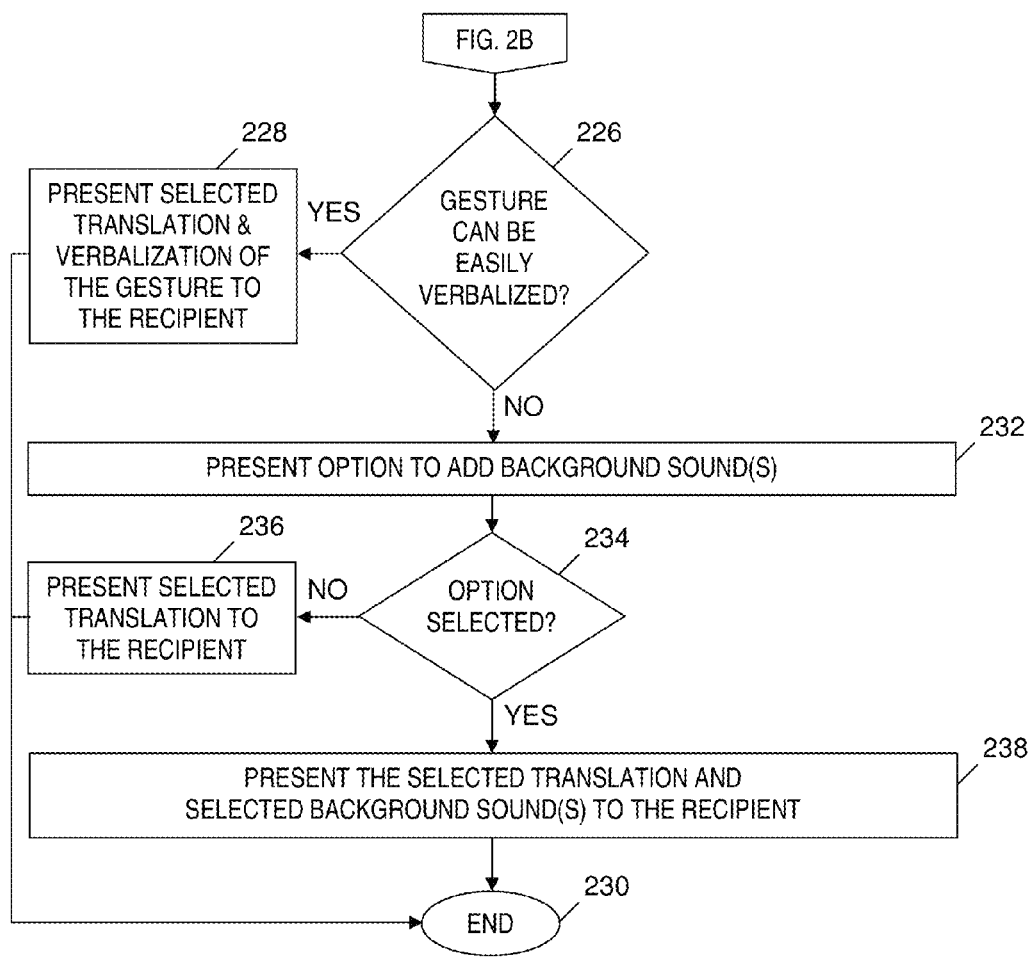

FIGS. 2A-2C depict a flowchart of a process for presenting translation choices and corresponding cultural nuances, where the process is implemented by the system of FIG. 1, in accordance with embodiments of the present invention. The process of FIGS. 2A-2C starts at step 200. In step 202, messaging system 104 (see FIG. 1) receives cultural information about a first user (a.k.a. sender) of the messaging system. In one embodiment, the cultural information received in step 202 includes identifiers of the culture of the sender and the language(s) known by the sender. In step 204, messaging system 104 (see FIG. 1) receives cultural information about a second user (a.k.a. recipient or intended recipient) of the messaging system. In one embodiment, the cultural information received in step 204 includes identifiers of the culture of the recipient and language(s) known by the recipient.

In one embodiment, the cultural information received in steps 202 and 204 is stored in profiles associated with the sender and recipient, respectively. In one embodiment, the profiles of the sender and recipient include respective speech indicators that indicate whether the sender or recipient prefers to verbalize input to and/or hear speech-based output from messaging system 104 (see FIG. 1). For example, the profile of a sight-impaired recipient may have the speech indicator.

The sender utilizes computer system 106 (see FIG. 1) to send a message to messaging system 104 (see FIG. 1) via network 110 (see FIG. 1), along with an indication of an intended recipient of the message and an indication that the messaging system is to translate the message into a language of the intended recipient. The sender may input the message in computer system 106 (see FIG. 1) by inputting text or speech. In step 206, messaging system 104 (see FIG. 1) receives the message from the sender's computer system 106 (see FIG. 1).

In step 208, translation tool 112 (see FIG. 1) retrieves one or more choices of translations (a.k.a. translation choices) of the message received in step 206. The translation choices are in the language of the recipient. For each of the retrieved choice(s) of translation(s), translation tool 112 also retrieves one or more corresponding cultural nuances applicable to all or part of the translation.

As used herein, a cultural nuance is defined as a culturally-specific interpretation of all or part of a message. A cultural nuance may include, but is not limited to, a level of respect or politeness, level of urgency related to a question, a cultural idiosyncrasy, a selection of tense, variations in interpretation, an emotional tone, or a potential for offensiveness that a particular culture applies to all or part of a message.

A cultural nuance may provide a degree of respect reflected in a particular translation according to requirements of a particular culture. For example, a translation of a message to be sent to a recipient of a particular culture may require the sender of the message to know the position or rank of the recipient of the message, and to then express an appropriate amount of respect required by the culture of the recipient.

A cultural nuance may also reflect cultural behaviors. For example, in some cultures, more urgency has to be placed on a particular item for it to be done. Hence, cultural nuances corresponding to translations may provide a rating describing how much urgency each translation is exhibiting. As another example, in some cultures, a closed question is not appropriate to obtain the result required; hence a cultural nuance may note that a message may require a follow-up question of "Please explain that back to me."

Furthermore, a cultural nuance may describe culturally-specific idiosyncrasies. Each language has its own slang and idiosyncrasies that have to be reflected in translations to ensure effective communication.

Still further, a cultural nuance may indicate and describe a gesture that provides context to a translation. For example, translations may be presented with a varying array of icons indicating gestures that provide additional context to the translations. In conjunction with presenting indications of gestures, notes may also be presented to describe the etiquette for using the indicated gestures. For instance, a note may indicate that a gesture for "wait" in a particular culture is similar to a gesture that is deemed offensive in other cultures.

The translation choices and cultural nuances retrieved in step 208 are retrieved from data storage unit 114 (see FIG. 1). In one embodiment, translation tool 112 (see FIG. 1) retrieves the cultural nuances from a translation database in data storage unit 114 (see FIG. 1) based on the translation database associating the cultural nuances with the translation choices and with the culture of the recipient included in the information received in step 204.

Step 208 also includes translation tool 112 (see FIG. 1) presenting the retrieved translation choices to the sender via computer system 106 (see FIG. 1) in a visual and/or audible manner. In one embodiment, if the speech indicator is not included in the sender's profile, the presentation in step 208 includes displaying the text of the retrieved translation choices in a displayed communication instance (e.g., displayed on a display screen coupled to computer system 106 in FIG. 1), and if the speech indicator is included in the sender's profile, then step 208 includes audibly presenting the translation choices in a speech-based communication instance (e.g., via a instance (e.g., via a speaker coupled to computer system 106 in FIG. 1).

In step 210, translation tool 112 (see FIG. 1) presents the cultural nuances corresponding to the translation choices retrieved in step 208 within the aforementioned communication instance. The cultural nuances are presented in step 210 to the sender via computer system 106 (see FIG. 1) in a visual and/or audible manner. For example, the cultural nuances are displayed to the sender in help bubbles whose content is customized based on input from the sender. The help bubbles correspond to extra fields that may be added in an Extensible Markup Language (XML) tree.

In one embodiment, if the speech indicator is not included in the sender's profile, the presentation in step 210 includes displaying the corresponding cultural nuances (e.g., on a display screen coupled to computer system 106 in FIG. 1), and if the speech indicator is included in the sender's profile, then step 210 includes audibly presenting the corresponding cultural nuances.

In one embodiment, prior to step 210, translation tool 112 (see FIG. 1) presents indicators of the corresponding cultural nuances to the sender and the sender then uses computer system 106 (see FIG. 1) to select one of the presented indicators (e.g., the sender directs a mouse to place an onscreen cursor over the indicator to select the indicator and view or hear the corresponding cultural nuance). Based on the selected indicator, the translation tool 112 (see FIG. 1) presents the cultural nuances in step 210.

In one embodiment, an interface provided to the sender and recipient by the translation tool 112 (see FIG. 1) allows the use of multiple types of media to put across a message. Such media types may include facial expression translations, gesture representations, idiomatic phrasing, idiomatic phrasing, symbols, and metaphoric icons.

The sender reviews the cultural nuances presented in step 210 to determine which translation choice is appropriate for the intended recipient based on the recipient's culture. Based on the sender's review of the cultural nuances presented in step 210, the sender selects one of the translation choices presented in step 208. The sender's review of the cultural nuances also educates and increases the knowledge of the sender about the culture of the intended recipient.

In step 212, translation tool 112 (see FIG. 1) receives the sender's selection of the translation choice, where the sender's selection is based on the sender's review of the cultural nuances presented in step 210. Hereinafter in the discussion of FIGS. 2A-2C, the translation choice whose selection is received in step 212 is also referred to as the selected translation.

After step 212, the process of FIGS. 2A-2C continues with step 214 in FIG. 2B. In step 214, translation tool 112 (see FIG. 1) searches data storage unit 114 (see FIG. 1) for any gesture(s) (i.e., observable bodily action(s)) that are part of the culture of the intended recipient and that communicate all or part of the selected translation, add meaning to the selected translation, add clarity to (i.e., remove ambiguity from) the selected translation, and/or add granular qualification to the selected translation.

In inquiry step 215, translation tool 112 (see FIG. 1) determines whether or not the search in step 214 finds a gesture. If the gesture is not found in step 215, then in step 216 the messaging system 104 (see FIG. 1) presents the selected translation to the recipient via the computer system 108 (see FIG. 1). The presentation of the selected translation to the recipient includes visually presenting the selected translation and/or audibly presenting the selected translation, based translation, based on the speech indicator in the profile of the recipient. Following step 216, the process for presenting translation choices and corresponding cultural nuances ends at step 217.

Returning to step 215, if the gesture is found, then the Yes branch of step 215 is taken and step 218 is performed. In step 218, translation tool 112 (see FIG. 1) presents an indicator corresponding to the gesture found in step 215. Step 218 presents the indicator to the sender via the computer system 106 (see FIG. 1). After step 218, the sender utilizes computer system 106 (see FIG. 1) to select the indicator, thereby instructing the translation tool 112 (see FIG. 1) to present the gesture that corresponds to the indicator.

In step 220, translation tool 112 (see FIG. 1) receives the sender's selection of the indicator presented in step 218. For example, the indicator may be a numeral that the translation tool 112 (see FIG. 1) displays in proximity to a word, phrase or sentence in a selected translation. The sender may direct the mouse of computer system 106 (see FIG. 1) to place the onscreen cursor over the numeral to select the numeral. The translation tool 112 (see FIG. 1) receives the selection of the numeral and, in response, displays the gesture corresponding to the numeral.

In step 222, translation tool 112 (see FIG. 1) presents the gesture found in step 216 to the sender via the computer system 106 (see FIG. 1). Optionally, step 222 includes the translation tool 112 presenting notes about how the presented gesture provides or facilitates an interpretation of all or part of the selected translation, where the interpretation is specific to the culture of the recipient. In one embodiment, the notes indicate whether the presented gesture is required to prevent ambiguity in the selected translation.

The gesture is presented in step 222 to the sender via computer system 106 (see FIG. 1) 1) by visually presenting the gesture, visually presenting a description of the gesture, audibly presenting the gesture, and/or audibly presenting a description of the gesture. In one embodiment, if the speech indicator is not included in the sender's profile, the presentation in step 222 includes displaying the gesture (e.g., on a display screen coupled to computer system 106 in FIG. 1), and if the speech indicator is included in the sender's profile, then step 222 includes verbalizing the description of the gesture (e.g., via a speaker coupled to computer system 106 in FIG. 1).

In inquiry step 224, translation tool 112 (see FIG. 1) determines whether the speech indicator in the recipient's profile is set. If step 224 determines that the speech indicator in the recipient's profile is not set, then in step 225 the messaging system 104 (see FIG. 1) presents the selected translation and the gesture found in step 215 to the recipient via the computer system 108 (see FIG. 1). The presentation of the selected translation and the gesture to the recipient in step 225 includes visually presenting the selected translation and the gesture to the recipient, and may optionally include audibly presenting the selected translation and a description of the gesture. In one embodiment, the gesture is presented to the recipient in step 225 as an animated picture (e.g., via an animated Graphics Interchange Format (GIF) file) to add meaning to a word or phrase in the translated message. Following step 225, the process of FIGS. 2A-2C ends at step 217.

Returning to inquiry step 224, if the speech indicator in the recipient's profile is set, then the process continues with step 226 in FIG. 2C.

In inquiry step 226, the translation tool 112 (see FIG. 1) determines whether the gesture gesture found in step 215 (see FIG. 2B) is easily verbalized based on predefined criteria. If step 226 determines that the gesture is easily verbalized, then in step 228 the messaging system 104 (see FIG. 1) audibly presents the selected translation and a verbalization that describes the gesture to the recipient via computer system 108 (see FIG. 1). Following step 228, the process of FIGS. 2A-2C ends at step 230.

Returning to step 226, if the translation tool 112 (see FIG. 1) determines that the gesture found in step 215 (see FIG. 2B) is not easily verbalized, then in step 232 the translation tool presents to the sender an option to add background sound(s) to a presentation of the selected translation to the recipient. The option is presented to the sender in step 232 via computer system 106 (see FIG. 1). Examples of the background sounds that may be added include: a cough to indicate sarcasm, a chuckle to indicate slight humor, a gasp to indicate surprise or awe, or a laugh to indicate embarrassment and/or nervousness in some cultures. The selected background sound(s) then become part of the presentation to the recipient (see step 238 below).

If the translation tool 112 (see FIG. 1) determines in step 234 that the option presented in step 232 is not selected by the sender, then in step 236, the messaging system 104 (see FIG. 1) audibly presents the selected translation to the recipient via computer system 108 (see FIG. 1). Following step 236, the process of FIGS. 2A-2C ends at step 230.

Returning to step 234, if the translation tool 112 (see FIG. 1) determines that the option presented in step 232 is selected by the sender, then in step 238, the messaging system 104 (see FIG. 1) audibly presents the selected translation and the selected background sound(s) to the recipient via computer system 108 (see FIG. 1). Following step 238, the process of FIGS. 2A-2C ends at step ends at step 230.

In one embodiment, the sender and recipient each requires access to only a plug-in database for each of their respective cultures. Since each participant in a conversation requires only the plug-in database, the translations and cultural nuance information sent is network efficient and does not use the bandwidth required by voice or video conferencing services.

In one embodiment, a flag is set to indicate an ambiguous sentence in a message to be sent, which requires further information to be added by the sender to clarify the sentence. Another flag is set to indicate a potentially offensive interpretation of a message or a gesture according to the culture of the recipient, which also requires clarification by the sender.

Figure 3:
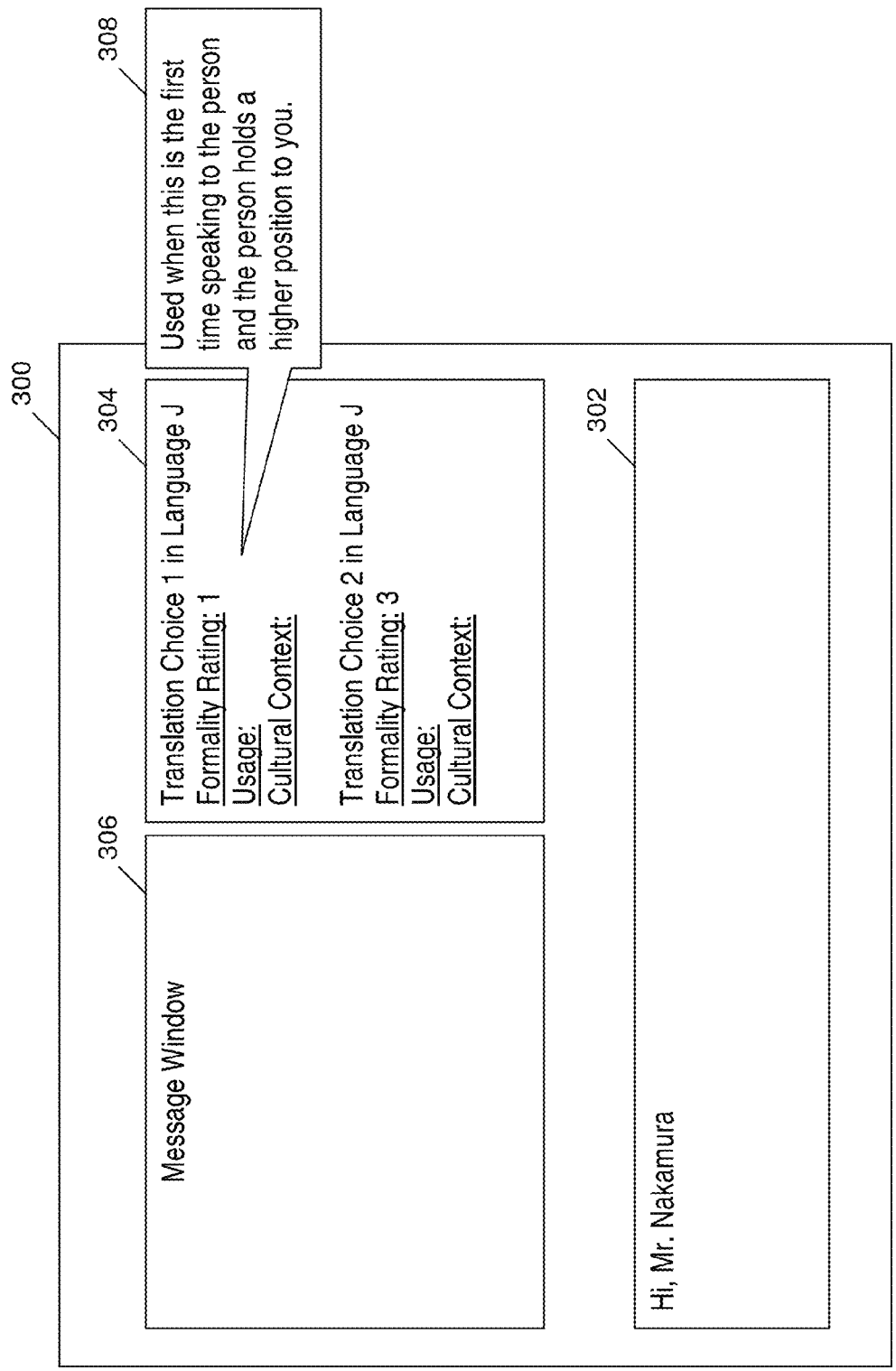
FIG. 3 is an example of a communication instance provided by the system of FIG. 1 and the process of FIGS. 2A-2C, where the communication instance includes a display of a cultural nuance, in accordance with embodiments of the present invention.
Figure 4:
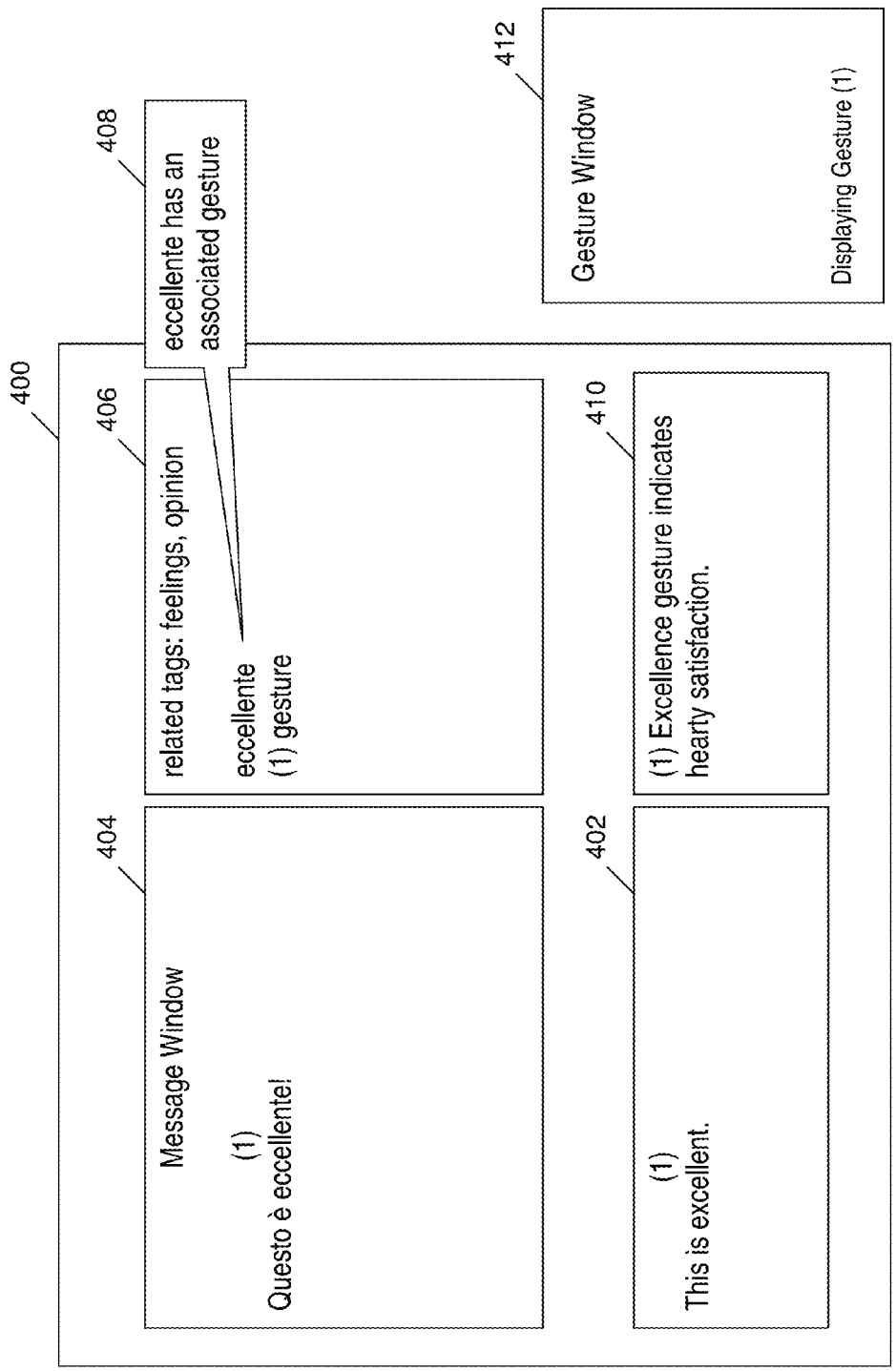
FIG. 4 is an example of a communication instance provided by the system of FIG. 1 and the process of FIGS. 2A-2C, where the communication instance includes a display of a gesture associated with part of a selected translation, in accordance with embodiments of the present invention.

In one embodiment, an Ajax or Ajax-style interface utilizes appropriate caching to provide a substantially fast graphical user interface (GUI) with minimal overheads due to the use of an animated GIF format. FIGS. 3 and 4 illustrate examples of a GUI that may be utilized by the present invention.

Examples of Communication Instances

FIG. 3 is an example of a communication instance provided by the system of FIG. 1 and the process of FIGS. 2A-2C, where the communication instance includes a display of a cultural nuance, in accordance with embodiments of the present invention. Exemplary window 300 is provided to the sender's computer system 106 (see FIG. 1) by translation tool 112 (see FIG. 1) in steps 208 and 210 in FIG. 2A. Window 300 includes a first area 302 in which the sender types the message to be translated (i.e., "Hi, Mr. Nakamura" in FIG. 3) into Language J (i.e., the language of (i.e., the language of the recipient). In a second area 304, translation tool 112 (see FIG. 1) presents two translation choices that are translations in Language J of the message in first area 302. The two translation choices are designated in FIG. 3 by the phrases "Translation Choice 1 in Language J" and "Translation Choice 2 in Language J." In an implementation of the present invention, the two actual translations shown in the script of Language J would be shown in area 304 instead of "Translation Choice 1 in Language J" and "Translation Choice 2 in Language J."

Window 300 also includes a third area 306 designated as the message window. The translation tool 112 (see FIG. 1) places in area 306 a translation the sender selects from area 304. Since FIG. 3 is an example of a communication instance prior to a translation being selected, no message is shown in the message window.

Translation tool 112 (see FIG. 1) displays a note 308 that indicates Translation Choice 1 in response to the sender directing a mouse to place an onscreen cursor over the "Usage" indicator in area 304 that corresponds to Translation Choice 1 (i.e., the uppermost "Usage" indicator in area 304). Note 308 includes a cultural nuance that describes the appropriate usage for Translation Choice 1 according to the culture of the recipient. Although not shown, the sender may place the cursor over the uppermost "Formality Rating" indicator to display another note that describes the level of formality that the culture of the recipient associates with Translation Choice 1. Further, the sender may place the cursor over the uppermost "Cultural Context" indicator to display still another note that describes a context of Translation Choice 1 according to the culture of the recipient.

FIG. 4 is an example of a communication instance provided by the system of FIG. 1 and and the process of FIGS. 2A-2C, where the communication instance includes a display of a gesture associated with part of a selected translation, in accordance with embodiments of the present invention. Exemplary window 400 is provided to the sender's computer system 106 (see FIG. 1) by translation tool 112 (see FIG. 1) in steps 218 and 222 in FIG. 2B. Window 400 includes a first area 402 that includes the message (i.e., "This is excellent") input by the sender and received by the messaging system in step 206 (see FIG. 2A). The message in area 402 is being translated from a first language to a second language, where the first language is indicated by the profile of the sender and the second language is indicated by the profile of the recipient. A second area 404 of window 400 displays a translation to be sent to the recipient (e.g., a translation whose selection is received in step 212 in FIG. 2A). Area 404 is also referred to herein as the message window.

Translation tool 112 (see FIG. 1) presents an indicator (i.e., "(1)") over the word "excellent" in area 402 and its translation "eccellente" in area 404 to indicate that the culture (i.e., Culture I) of the recipient includes a gesture associated with the words "excellent" and "eccellente" (see step 218 in FIG. 2B). In a third area 406 of window 400, translation tool 112 (see FIG. 1) displays a list of any indicators included in the message window and tags related to the indicators. In this case the list in area 406 includes only one indicator: "(1)" which indicates a gesture.

Translation tool 112 (see FIG. 1) displays a note 408 that indicates that "eccellente" has an associated gesture. Note 408 is displayed by the translation tool in response to the sender directing a mouse to place an onscreen cursor over the word "eccellente" in area 406.

In a fourth area 410 of window 400, translation tool 112 (see FIG. 1) displays a description of the gesture indicated by "(1)" according to the culture of the recipient.

Translation tool 112 (see FIG. 1) displays a gesture window 412 in response to the sender placing the cursor over the "(1)" indicator in the message window. The gesture window 412 displays a hand gesture (not shown) associated with "eccellente" according to Culture I. The hand gesture is a single hand connecting the thumb and forefinger into a circle and holding the other fingers straight. Although in Culture I the aforementioned hand gesture provides further context to the translation in area 404, other cultures may consider the same hand gesture to be offensive.

Multiple Collaborators

In one embodiment, system 100 (see FIG. 1) is implemented by a web 2.0 application employing wiki software for collaboration. Multiple computer systems 116-1, . . . , 116-N (see FIG. 1) are utilized by multiple collaborators to contribute to creating and/or editing a translation database stored in data storage unit 114 (see FIG. 1). Each of the multiple collaborators may create and/or edit the translation database with text, speech and/or sound input. To add speech input or sound recordings to the translation database, a collaborator may capture the speech or sound via a microphone coupled to the collaborator's computer system. To add a gesture to the translation database, a collaborator may capture an example of a gesture via a webcam interface. Extending the translation database by multiple collaborators is self-regulating and can be tracked in the event of a disagreement.

Figure 5:
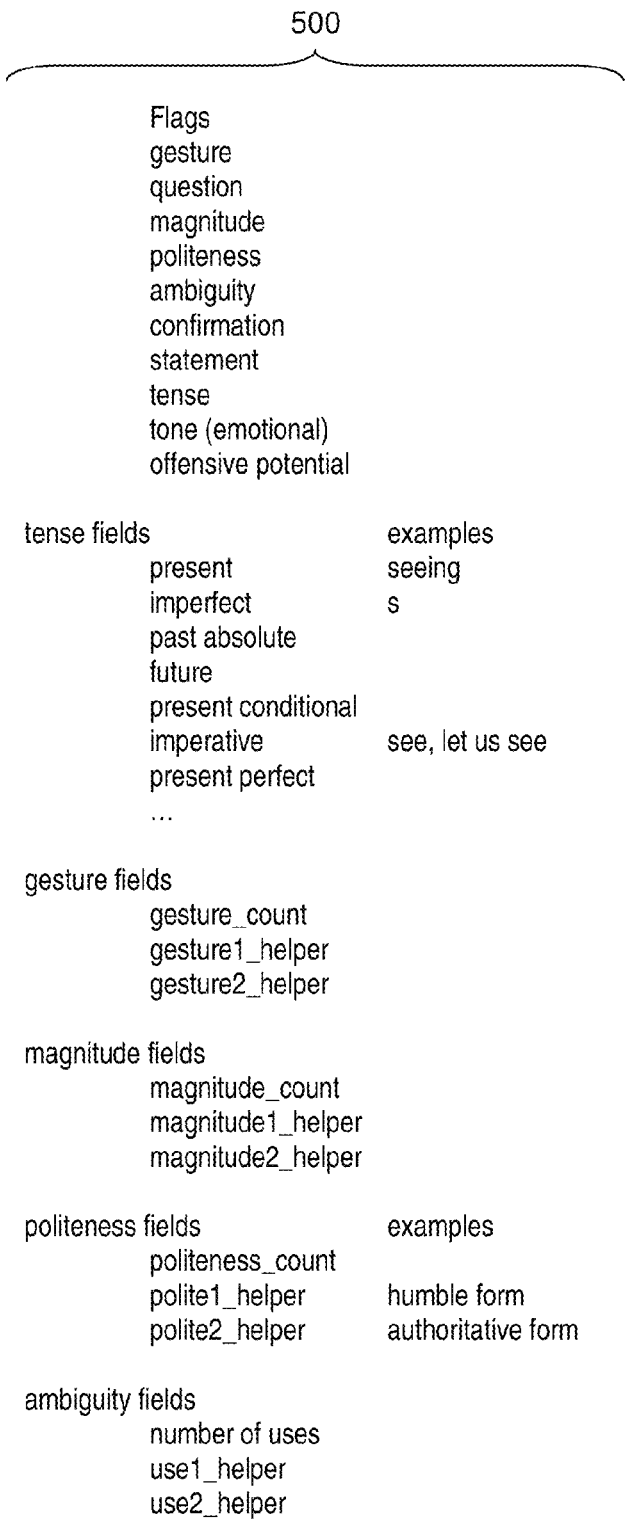
FIG. 5 is an example of a data structure for a communication instance being presented in the process of FIGS. 2A-2C, where the data structure is extendible by multiple collaborators using computer systems included in the system of FIG. 1, in accordance with embodiments of the present invention.

FIG. 5 is an example of a data structure for a communication instance being presented in the process of FIGS. 2A-2C, where the data structure is extendible by multiple collaborators using computer systems included in the system of FIG. 1, in accordance with embodiments of the present invention. Data structure 500 is an example of an extensible data structure for a communication instance presented to a sender (see steps 208 and 210 in FIG. 2A, and step 222 in FIG. 2B) or to a recipient (see steps 216 and 226 in FIG. 2B and steps 228, 236 and 238 in FIG. 2C). Data structure 500 includes extensible fields for tense, gesture, magnitude, politeness, and ambiguity associated with a message being processed by translation tool 112 (see FIG. 1). The aforementioned extensible fields may be added to or edited by collaborators using computer systems 116-1, . . . , 116-N (see FIG. 1).

Computer System

Figure 6:
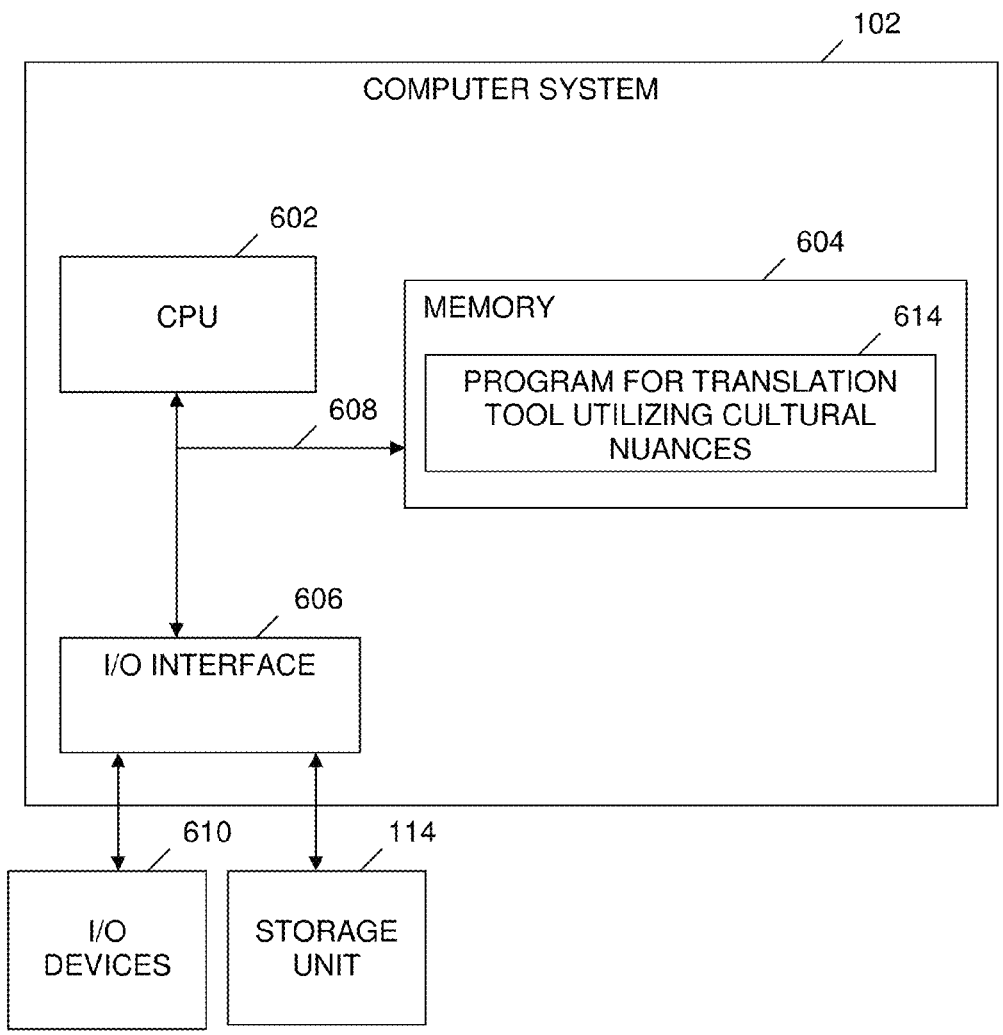
FIG. 6 is a block diagram of a computer system that is included in the system of FIG. 1 and that implements the process of FIGS. 2A-2C, in accordance with embodiments of the present invention.

FIG. 6 is a block diagram of a computer system that is included in the system of FIG. 1 and that implements the process of FIGS. 2A-2C, in accordance with embodiments of the present invention. Computer system 102 generally comprises a central processing unit (CPU) 602, a memory 604, an I/O interface 606, and a bus 608. Further, computer system 102 is coupled to I/O devices 610 and a computer data storage unit 114. CPU 602 performs computation and control functions of computer system 102. CPU 602 may comprise a single processing unit, or be distributed across one or more processing units in one or more locations (e.g., on a client and server).

Memory 604 may comprise any known computer readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store and retrieve information (e.g., data or program instructions such as program code 614) from an auxiliary storage device such as computer data storage unit 114 or another computer data storage unit (not shown). Computer data storage unit 114 may comprise any known computer readable storage medium, which is described below. For example, computer data storage unit 114 may be a non-volatile data storage device, such as a magnetic disk drive (i.e., hard disk drive) or an optical disc drive (e.g., a CD-ROM drive which receives a CD-ROM disk).

Memory 604 may store computer program code 614 that provides the logic for presenting choices of different translations of a message and corresponding culturally-specific interpretations of the different translations, which is included in the process in FIGS. 2A-2C. In one embodiment, program code 614 is included in translation tool 112 (see FIG. 1). Further, memory 604 may include other systems not shown in FIG. 6, such as an operating system (e.g., Linux) that runs on CPU 602 and provides control of various components within and/or connected to computer system 102.

Storage unit 114 and/or one or more other computer data storage units (not shown) that are coupled to computer system 102 may store translations, information from the profiles of the sender and recipient of a message (including identifiers of the cultures of and the languages understood by the sender and recipient), and cultural nuances associated with a translation and a culture.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 102). Furthermore, an embodiment of the present invention may take the form of a computer program product embodied in one or more computer readable medium(s) (e.g., embodied in one or more computer readable medium(s) (e.g., memory 604 or computer data storage unit 114) having computer readable program code (e.g., program code 614) embodied or stored thereon.

Any combination of one or more computer readable medium(s) (e.g., memory 604 and computer data storage unit 114) may be utilized. The computer readable medium may be a computer readable signal medium or a computer readable storage medium. A computer readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium can contain or store a program (e.g., program 614) for use by or in connection with a system, apparatus, or device for carrying out instructions. Each of the terms "computer-readable storage medium" and "computer-readable, tangible storage device," as used herein, is not to be construed as being transitory signals per se or a signal propagation medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium signal medium may be any computer readable medium that is not a computer readable storage medium and that can communicate, propagate, or transport a program for use by or in connection with a system, apparatus, or device for carrying out instructions.

Program code (e.g., program code 614) embodied on a computer readable medium may be transmitted using any appropriate medium, including but not limited to wireless, wireline, optical fiber cable, RF, etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2C) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 604 or computer data storage unit 114) that can direct a computer (e.g., computer system 102), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions which are carried out on the carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of presenting choices of different translations of a message and corresponding interpretations of the different translations. Thus, an embodiment of the present invention discloses a process for supporting computer infrastructure, comprising integrating, hosting, maintaining and deploying computer-readable code (e.g., program code 614) into a computer system (e.g., computer system 102), wherein the code in combination with the computer system is capable of performing a process of presenting choices of different translations of a message and corresponding interpretations of the different translations.

In another embodiment, the invention provides a business method that performs the process steps of the invention on a subscription, advertising and/or fee basis. That is, a service provider, such as a Solution Integrator, can offer to create, maintain, support, etc. a process of presenting choices of different translations of a message and corresponding interpretations of the different translations. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2C and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of presenting choices of different translations of a message and corresponding interpretations of said different translations, said method comprising:
   a computer system receiving said message input by a first user (sender) to be sent to a second user (recipient);
   said computer system receiving an indication of a culture of said recipient;
   based on said received indication of said culture of said recipient, a processor of said computer system retrieving different translations of said message and respective levels of formality of said different translations, said levels of formality being levels of politeness that said culture of said recipient respectively associates with said different translations of said message;
   said computer system presenting to said sender choices of said different translations of said message and said levels of formality, wherein said different translations are in a language understood by said recipient;
   said computer system receiving a selection by said sender of a translation included in said different translations, wherein said selection of said translation is based on a review by said sender of said presented choices of said different translations of said message and said levels of formality;
   subsequent to said receiving said selection of said translation, said computer system searching a data repository for and subsequently finding in said data repository a gesture which is part of said culture of said recipient and which communicates at least a part of said translation, adds a meaning to said translation, removes an ambiguity in said translation, and adds a granular qualification to said translation;
   in response to said finding said gesture, said computer system presenting to said sender an indicator of said gesture and said translation, said indicator being in proximity to a portion of said presented translation;
   said computer system receiving a selection by said sender of said indicator of said gesture, and in response, presenting said gesture and notes about said gesture to said sender, said notes indicating to said sender how said gesture provides or facilitates an interpretation of said translation, said interpretation being specific to said culture of said recipient, and said notes further indicating to said sender that said gesture is required to prevent said ambiguity in said translation, wherein a result of said presenting said gesture and said notes about said gesture is an increase in knowledge of said sender about said culture of said recipient; and
   said computer system presenting said selected translation and said gesture to said recipient.

2. The method of claim 1, further comprising said computer system receiving updates of said levels of formality from a plurality of users utilizing a plurality of computer units that access said computer system via a computer network.

3. The method of claim 1, wherein said presenting said gesture and said notes comprises said computer system presenting a description of an etiquette for using said gesture in said culture of said recipient, and a specification of another culture in which said gesture is deemed offensive.

4. The method of claim 1, further comprising said computer system receiving updates of different gestures corresponding to said different translations from a plurality of users utilizing a plurality of computer units that access said computer system via a computer network.

5. The method of claim 1, further comprising:
   receiving identifiers of said culture of said recipient and said language understood by said recipient; and
   updating a profile of said recipient based on said received identifiers of said culture and said language,
   wherein said retrieving said levels of formality of said different translations includes:
   retrieving said culture from said profile; and
   retrieving said levels of formality from a database based on said database associating said levels of formality with said culture and with said different translations in a one-to-one correspondence.

6. The method of claim 1, further comprising educating said sender about said culture of said recipient based on said review of said levels of formality by said sender.

7. The method of claim 1, further comprising:
   subsequent to said presenting said gesture and said notes about said gesture, and prior to said presenting said selected translation and said gesture to said recipient, said computer system determining a profile of said recipient indicates said recipient prefers said translation of said message to be presented in speech rather than text; and
   in response to said determining said profile of said recipient indicates said recipient prefers said translation of said message to be presented in speech, said computer system performing said presenting said selected translation and said gesture by audibly presenting to said recipient said selected translation and a verbalization that describes said gesture.

8. A computer system comprising:
   a hardware central processing unit (CPU);
   a memory coupled to said CPU; and
   a computer-readable, tangible storage device coupled to said CPU, said storage device containing instructions that when carried out by said CPU via said memory implement a method of presenting choices of different translations of a message and corresponding interpretations of said different translations, said method comprising:
   said computer system receiving said message input by a first user (sender) to be sent to a second user (recipient);
   said computer system receiving an indication of a culture of said recipient;
   based on said received indication of said culture of said recipient, said computer system retrieving different translations of said message and respective levels of formality of said different translations, said levels of formality being levels of politeness that said culture of said recipient respectively associates with said different translations of said message;
   said computer system presenting to said sender choices of said different translations of said message and said levels of formality, wherein said different translations are in a language understood by said recipient;
   said computer system receiving a selection by said sender of a translation included in said different translations, wherein said selection of said translation is based on a review by said sender of said presented choices of said different translations and said levels of formality by said sender;
   subsequent to said receiving said selection of said translation, said computer system searching a data repository for and subsequently finding in said data repository a gesture which is part of said culture of said recipient and which communicates at least a part of said translation, adds a meaning to said translation, removes an ambiguity in said translation, and adds a granular qualification to said translation;

in response to said finding said gesture, said computer system presenting to said sender an indicator of said gesture and said translation, said indicator being in proximity to a portion of said presented translation;

said computer system receiving a selection by said sender of said indicator of said gesture, and in response, presenting said gesture and notes about said gesture to said sender, said notes indicating to said sender how said gesture provides or facilitates an interpretation of said translation, said interpretation being specific to said culture of said recipient, and said notes further indicating to said sender that said gesture is required to prevent said ambiguity in said translation, wherein a result of said presenting said gesture and said notes about said gesture is an increase in knowledge of said sender about said culture of said recipient; and presenting said selected translation and said gesture to said recipient.

9. The system of claim 8, wherein said method further comprises said computer system receiving updates of said levels of formality from a plurality of users utilizing a plurality of computer units that access said computer system via a computer network.

10. The system of claim 8, wherein said presenting said gesture and said notes comprises said computer system presenting a description of an etiquette for using said gesture in said culture of said recipient, and a specification of another culture in which said gesture is deemed offensive.

11. The system of claim 8, wherein said method further comprises said computer system receiving updates of different gestures corresponding to said different translations from a plurality of users utilizing a plurality of computer units that access said computer system via a computer network.

12. The system of claim 8, wherein said method further comprises:

subsequent to said presenting said gesture and said notes about said gesture, and prior to said presenting said selected translation and said gesture to said recipient, said computer system determining a profile of said recipient indicates said recipient prefers said translation of said message to be presented in speech rather than text; and in response to said determining said profile of said recipient indicates said recipient prefers said translation of said message to be presented in speech, said computer system performing said presenting said selected translation and said gesture by audibly presenting to said recipient said selected translation and a verbalization that describes said gesture.

13. A computer program product, comprising:
a computer-readable, tangible storage device; and
a computer-readable program code stored on the computer-readable, tangible storage device, said computer-readable program code containing instructions that, when executed by a processor of a computer system, implement a method of presenting choices of different translations of a message and corresponding interpretations of said different translations, said method comprising the steps of:

said computer system receiving said message input by a first user (sender) to be sent to a second user (recipient);

said computer system receiving an indication of a culture of said recipient;

said computer system retrieving different translations of said message and respective levels of formality of said different translations, said levels of formality being levels of politeness that said culture of said recipient associates with said different translations of said message;

said computer system presenting to said sender choices of said different translations of said message and said levels of formality, wherein said different translations are in a language understood by said recipient;

said computer system receiving a selection by said sender of a translation included in said different translations, wherein said selection of said translation is based on a review by said sender of said presented choices of said different translations of said message and said levels of formality;

subsequent to said receiving said selection of said translation, said computer system searching a data repository for and subsequently finding in said data repository a gesture which is part of said culture of said recipient and which communicates at least a part of said translation, adds a meaning to said translation, removes an ambiguity in said translation, and adds a granular qualification to said translation;

in response to said finding said gesture, said computer system presenting to said sender an indicator of said gesture and said translation, said indicator being in proximity to a portion of said presented translation;

said computer system receiving a selection by said sender of said indicator of said gesture, and in response, presenting said gesture and notes about said gesture to said sender, said notes indicating to said sender how said gesture provides or facilitates an interpretation of said translation, said interpretation being specific to said culture of said recipient, and said notes further indicating to said sender that said gesture is required to prevent said ambiguity in said translation, wherein a result of said presenting said gesture and said notes about said gesture is an increase in knowledge of said sender about said culture of said recipient; and presenting said selected translation to and said gesture said recipient.

14. The program product of claim 13, wherein said method further comprises said computer system receiving updates of said levels of formality from a plurality of users utilizing a plurality of computer units that access said computer system via a computer network.

15. The program product of claim 13, wherein said presenting said gesture and said notes comprises said computer system presenting a description of an etiquette for using said gesture in said culture of said recipient, and a specification of another culture in which said gesture is deemed offensive.

16. The program product of claim 13, wherein said method further comprises said computer system receiving updates of different gestures corresponding to said different translations from a plurality of users utilizing a plurality of computer units that access said computer system via a computer network.

17. The program product of claim 13, wherein said method further comprises:

subsequent to said presenting said gesture and said notes about said gesture, and prior to said presenting said selected translation and said gesture to said recipient, said computer system determining a profile of said recipient indicates said recipient prefers said translation of said message to be presented in speech rather than text; and in response to said determining said profile of said recipient indicates said recipient prefers said translation of said message to be presented in speech, said computer system performing said presenting said selected translation and said gesture by audibly presenting to said recipient said selected translation and a verbalization that describes said gesture.

18. A process for supporting computing infrastructure, said process comprising:

providing at least one support service for at least one of creating, integrating, hosting, maintaining, and deploying computer-readable code in a computing system comprising a processor, wherein said code, when carried out by said processor, implements a method of presenting choices of different translations of a message and corresponding interpretations of said different translations, said method comprising the steps of:

said computing system receiving said message input by a first user (sender) to be sent to a second user (recipient);

said computing system receiving an indication of a culture of said recipient;

said computing system retrieving different translations of said message and respective levels of formality of said different translations, said levels of formality being levels of politeness that said culture of said recipient respectively associates with said different translations of said message;

said computing system presenting to said sender choices of said different translations of said message and said levels of formality, wherein said different translations are in a language understood by said recipient;

said computing system receiving a selection by said sender of a translation included in said different translations, wherein said selection of said translation is based on a review by said sender of said presented choices of said different translations of said message and said levels of formality;

subsequent to said receiving said selection of said translation, said computer system searching a data repository for and subsequently finding in said data repository a gesture which is part of said culture of said recipient and which communicates at least a part of said translation, adds a meaning to said translation, removes an ambiguity in said translation, and adds a granular qualification to said translation;

in response to said finding said gesture, said computer system presenting to said sender an indicator of said gesture and said translation, said indicator being in proximity to a portion of said presented translation;

said computer system receiving a selection by said sender of said indicator of said gesture, and in response, presenting said gesture and notes about said gesture to said sender, said notes indicating to said sender how said gesture provides or facilitates an interpretation of said translation, said interpretation being specific to said culture of said recipient, and said notes further indicating to said sender that said gesture is required to prevent said ambiguity in said translation, wherein a result of said presenting said gesture and said notes about said gesture is an increase in knowledge of said sender about said culture of said recipient; and said computing system presenting said selected translation and said gesture to said recipient.

19. The process of claim 18, wherein said method further comprises said computing system receiving updates of said levels of formality from a plurality of users utilizing a plurality of computer units that access said computer system via a computer network.

20. The process of claim 18, wherein said method further comprises:

subsequent to said presenting said gesture and said notes about said gesture, and prior to said presenting said selected translation and said gesture to said recipient, said computing system determining a profile of said recipient indicates said recipient prefers said translation of said message to be presented in speech rather than text; and in response to said determining said profile of said recipient indicates said recipient prefers said translation of said message to be presented in speech, said computing system performing said presenting said selected translation and said gesture by audibly presenting to said recipient said selected translation and a verbalization that describes said gesture.

* * * * *